United States Patent …

(12) United States Patent
Tang

(10) Patent No.: US 11,086,426 B2
(45) Date of Patent: Aug. 10, 2021

(54) APPARATUS AND METHOD FOR DRIVING A TOUCH DISPLAY PANEL

(71) Applicant: Novatek Microelectronics Corp., Hsinchu (TW)

(72) Inventor: Wing-Kai Tang, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/384,925

(22) Filed: Apr. 16, 2019

(65) Prior Publication Data

US 2019/0354218 A1 Nov. 21, 2019

Related U.S. Application Data

(60) Provisional application No. 62/672,062, filed on May 16, 2018.

(51) Int. Cl.
*G06F 3/041* (2006.01)
*G06F 3/047* (2006.01)

(52) U.S. Cl.
CPC ............ *G06F 3/0412* (2013.01); *G06F 3/047* (2013.01); *G06F 3/0416* (2013.01)

(58) Field of Classification Search
None
See application file for complete search history.

(56) References Cited

U.S. PATENT DOCUMENTS

| 8,810,543 | B1* | 8/2014 | Kurikawa | G06F 3/044 345/174 |
| 9,430,076 | B2 | 8/2016 | Chen et al. | |
| 9,880,677 | B2 | 1/2018 | Lee et al. | |
| 2008/0042992 | A1* | 2/2008 | Kim | G06F 3/0416 345/173 |

(Continued)

FOREIGN PATENT DOCUMENTS

| CN | 103871378 | 6/2014 |
| CN | 104699334 | 6/2015 |

(Continued)

OTHER PUBLICATIONS

Office Action of Taiwan Counterpart Application, dated May 8, 2020, pp. 1-10.

*Primary Examiner* — Christopher R Lamb
(74) *Attorney, Agent, or Firm* — JCIPRNET

(57) ABSTRACT

An apparatus for driving a touch display panel is provided. The touch display panel has a plurality of data lines and a plurality of sensing lines. The apparatus includes a first device, a second device and a touch controller. The first device includes a plurality of touch sensing channels configured to sense the first portion of the sensing lines. The second device includes a plurality of touch sensing channels configured to sense the second portion of the sensing lines. The touch controller receives respective touch information from the first device and the second device. The respective touch information includes a first touch information corresponding to the first portion of the sensing lines and a second (Continued)

touch information corresponding to the second portion of the sensing lines. The touch controller determines a touch event of the touch display panel according to the first touch information and the second touch information.

18 Claims, 12 Drawing Sheets

(56) References Cited

U.S. PATENT DOCUMENTS

| | | | |
|---|---|---|---|
| 2009/0250269 A1* | 10/2009 | Hung | G06F 3/044 |
| | | | 178/18.06 |
| 2011/0069015 A1* | 3/2011 | Nurmi | G06F 3/041 |
| | | | 345/173 |
| 2014/0160058 A1 | 6/2014 | Chen et al. | |
| 2015/0160761 A1 | 6/2015 | Lee et al. | |
| 2015/0301580 A1* | 10/2015 | Choe | G09G 5/377 |
| | | | 345/173 |

FOREIGN PATENT DOCUMENTS

| | | |
|---|---|---|
| CN | 107562279 | 1/2018 |
| TW | 201322094 | 6/2013 |

\* cited by examiner

APPARATUS AND METHOD FOR DRIVING A TOUCH DISPLAY PANEL

CROSS-REFERENCE TO RELATED APPLICATION

This application claims the priority benefit of U.S. provisional application Ser. No. 62/672,062, filed on May 16, 2018. The entirety of the above-mentioned patent application is hereby incorporated by reference herein and made a part of this specification.

BACKGROUND

Technical Field

The invention relates to an apparatus and a method for driving a touch display panel.

Description of Related Art

In related arts, touch sensors are built-in a display panel to form a touch display panel, such that the touch display panel has a display function and a touch sensing function. Corresponding to the touch display panel, a touch controller and/or a timing controller may be added to a display driver. The combined integrated-circuit chip such as a touch with display driver integrated-circuit chip (TDDI IC) can drive the touch display panel to perform the display function and the touch sensing function.

For medium/large panel, at least two TDDI ICs may be necessary to drive the touch display panel to display image and sense touch events. The touch display panel are divided into a plurality of touch areas. Each TDDI IC is configured to process touch information of the corresponding touch area with different parameters and/or program codes since different touch areas have different edge conditions. The touch information processing is complex due to the different edge conditions. In addition, when sensing the touch events, each TDDI IC may simply sense the corresponding touch area of the touch display panel. In some cases, the TDDI ICs may erroneously sense the touch events at edge regions between different touch areas.

SUMMARY

The invention is directed to an apparatus and a method for driving a touch display panel, capable of correctly determining a touch event of the touch display panel.

An embodiment of the invention provides an apparatus for driving a touch display panel. The touch display panel has a plurality of data lines and a plurality of sensing lines. The apparatus includes a first device, a second device and a touch controller. The first device includes a plurality of display driving channels and a plurality of touch sensing channels. The plurality of display driving channels are coupled to a first portion of the data lines to drive a first image data to the first portion of the data lines. The plurality of touch sensing channels are coupled to a first portion of the sensing lines to sense the first portion of the sensing lines. The second device includes a plurality of display driving channels and a plurality of touch sensing channels. The plurality of display driving channels are coupled to a second portion of the data lines to drive a second image data to the second portion of the data lines. The plurality of touch sensing channels are coupled to a second portion of the sensing lines to sense the second portion of the sensing lines. The touch controller is configured to receive respective touch information from the first device and the second device. The respective touch information includes a first touch information corresponding to the first portion of the sensing lines and a second touch information corresponding to the second portion of the sensing lines. The touch controller is further configured to determine a touch event of the touch display panel according to the first touch information and the second touch information. The first device is implemented in a first integrated-circuit chip. The touch controller is implemented in a second integrated-circuit chip.

In an embodiment of the invention, the touch controller includes a first input port, a second input port and a core circuit. The first input port is configured to receive a first touch information from the first device. The second input port is configured to receive a second touch information from the second device. The core circuit is coupled to the first input port and the second input port. The core circuit is configured to determine the touch event according to the first touch information and the second touch information.

In an embodiment of the invention, the touch controller further includes a front-end circuit. The front-end circuit is coupled to the first input port and the second input port. The front-end circuit is configured to receive the respective touch information from the first input port and the second input port and transmit the respective touch information to the core circuit.

In an embodiment of the invention, the apparatus further includes a timing controller. The timing controller is coupled to the first device and the second device. The timing controller is configured to respectively output the first image data and the second image data to the first device and the second device.

In an embodiment of the invention, the first device includes a timing controller. The timing controller is coupled to the display driving channels of the first device. The timing controller is configured to output the first image data to the display driving channels of the first device. The second device includes a timing controller. The timing controller is coupled to the display driving channels of the second device. The timing controller is configured to output the second image data to the display driving channels of the second device.

In an embodiment of the invention, the second device is implemented in the second integrated-circuit chip.

In an embodiment of the invention, the second device is implemented in a third integrated-circuit chip.

In an embodiment of the invention, the first image data and the second image data are a first portion and a second portion of an image frame or from different image frames.

An embodiment of the invention provides a method for driving a touch display panel. The touch display panel has a plurality of data lines and a plurality of sensing lines. The method include: operating a first device to drive a first image data to a first portion of the data lines, and operating a second device to drive a second image data to a second portion of the data lines in a display phase; operating the first device to sense a first portion of the sensing lines to obtain a first touch information and operating the second device to sense a second portion of the sensing lines to obtain a second touch information in a touch sensing phase; and determining a touch event of the touch display panel by a touch controller according to the first touch information and the second touch information. The first device is implemented in a first integrated-circuit chip. The touch controller is implemented in a second integrated-circuit chip.

An embodiment of the invention provides a touch controller for detecting a touch event of a touch display panel. The touch display panel has a plurality of data lines and a plurality of sensing lines. The touch controller includes a first input port, a second input port and a core circuit. The first input port is configured to receive a first touch information from a first device. The first device includes a plurality of display driving channels and a plurality of touch sensing channels. The display driving channels are configured to be coupled to a first portion of the data lines to drive a first image data thereto. The touch sensing channels are configured to be coupled to a first portion of the sensing lines and to sense the first portion of the sensing lines to obtain the first touch information. The second input port is configured to receive a second touch information from a second device. The second device includes a plurality of display driving channels and a plurality of touch sensing channels. The display driving channels are configured to be coupled to a second portion of the data lines to drive a second image data thereto. The touch sensing channels are configured to be coupled to a second portion of the sensing lines and to sense the second portion of the sensing lines to obtain the second touch information. The core circuit is coupled to the first input port and the second input port. The core circuit is configured to determine the touch event according to the first touch information and the second touch information. The first device is implemented in a first integrated-circuit chip. The touch controller is implemented in a second integrated-circuit chip.

An embodiment of the invention provides a touch controller for detecting a touch event of a touch display panel. The touch display panel has a plurality of data lines and a plurality of sensing lines. The touch controller includes a first input port, a second input port and a core circuit. The first input port is configured to receive a first touch information from a first device. The first device includes a plurality of touch sensing channels. The touch sensing channels are configured to be coupled to a first portion of the sensing lines and configured to sense the first portion of the sensing lines to obtain the first touch information. The second input port is configured to receive a second touch information from a second device. The second device includes a plurality of touch sensing channels. The touch sensing channels are configured to be coupled to a second portion of the sensing lines and configured to sense the second portion of the sensing lines to obtain the second touch information. The core circuit is coupled to the first input port and the second input port. The core circuit is configured to determine the touch event according to the first touch information and the second touch information. The first device is implemented in a first integrated-circuit chip. The touch controller is implemented in a second integrated-circuit chip.

In an embodiment of the invention, the touch controller further includes a front-end circuit. The front-end circuit is coupled to the first input port and the second input port. The front-end circuit is configured to receive the respective touch information from the first input port and the second input port and transmit the respective touch information to the core circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
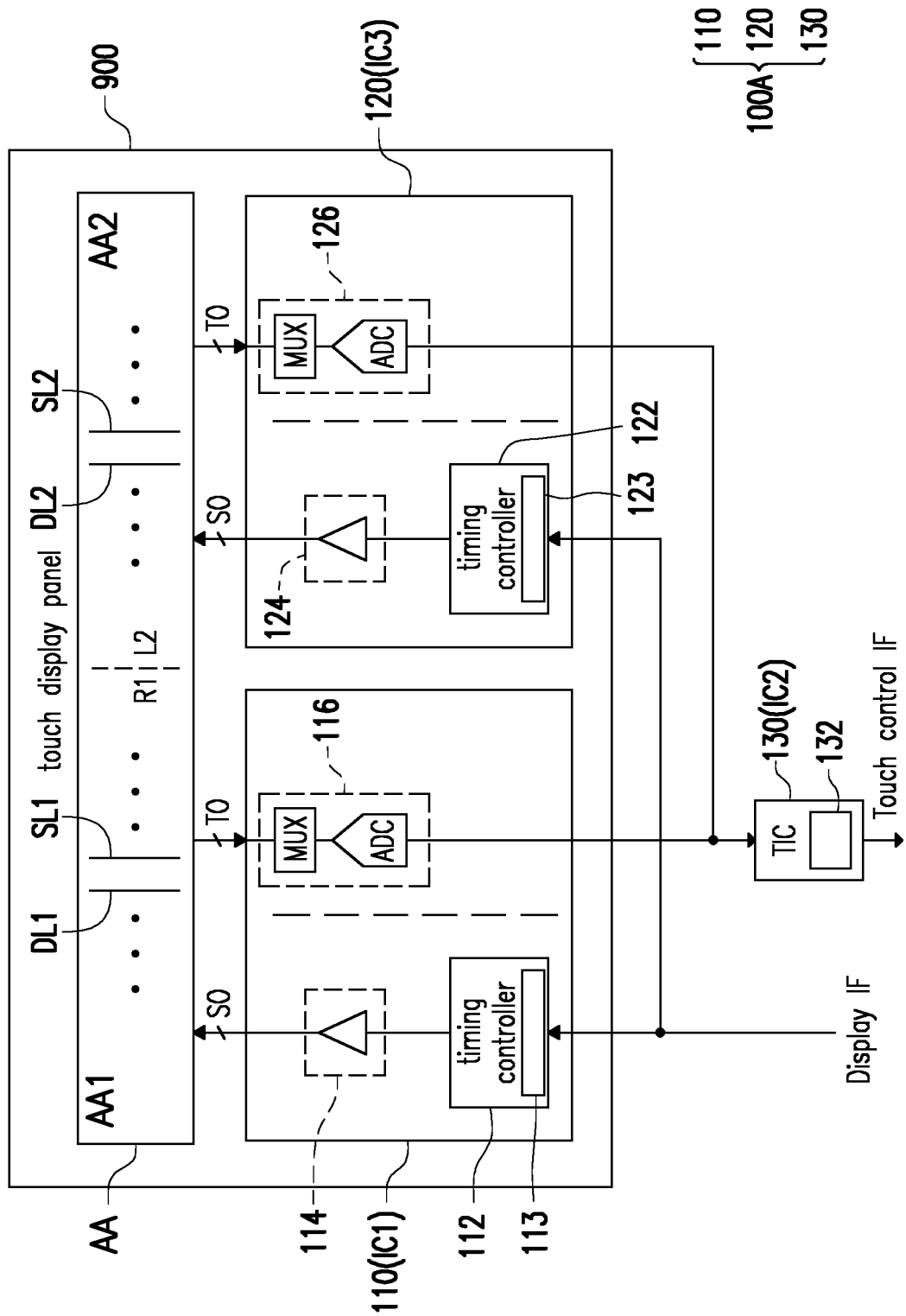
FIG. 1 illustrates a schematic diagram of an apparatus for driving a touch display panel according to an embodiment of the invention.

FIG. 1 illustrates a schematic diagram of an apparatus for driving a touch display panel according to an embodiment of the invention. Referring to FIG. 1, the apparatus 100A is configured to drive the touch display panel 900 to perform a display function and a touch sensing function. The touch display panel 900 includes a plurality of data lines DL1 and DL2 and a plurality of sensing lines SL1 and SL2. For simplicity, only two data lines DL1 and DL2 and two sensing lines SL1 and SL2 are illustrated in FIG. 1, and the invention is not limited thereto. The apparatus 100A includes a first device 110, a second device 120 and a touch controller 130. The touch display panel 900 includes an active area AA, and the active area AA is divided into two touch display areas AA1 and AA2. The first device 110 is configured to drive the touch display area AA1 to perform the display function and the touch sensing function. The second device 120 is configured to drive the touch display area AA2 to perform the display function and the touch sensing function.

The numbers of the first device 110, the second device 120 and the divided touch display areas AA1 and AA2 do not intend to limit the invention. In other embodiments, the apparatus 100A may include more than two devices for driving the touch display panel 900 to perform the display function and the touch sensing function, and the active area AA of the touch display panel 900 may also be divided into more than two touch display areas.

The first device 110 includes a timing controller 112, a plurality of display driving channels 114 and a plurality of touch sensing channels 116. For simplicity, only one display driving channel 114 and one touch sensing channel 116 are illustrated in FIG. 1, and the invention is not limited thereto. The timing controller 112 is coupled to the display driving channels 114. The timing controller 112 includes a data division circuit 113. The data division circuit 113 receives an image data from a display interface (IF) and performs a data division operation to obtain a first image data from the image data. The timing controller 112 outputs the first image data to the display driving channels 114. The display driving channels 114 are coupled to the data lines DL1 of the touch display area AA1, i.e. the first portion of the data lines DL. The display driving channels 114 drive the first image data to the data lines DL1. Each of the display driving channels 114, for example, includes an output buffer to drive the first image data to the corresponding data line DL1. The first image data serves as a source output SO and is outputted to the data lines DL1.

When a touch event happens in the touch display area AA1, a first touch information may be transmitted via the sensing lines SL1, i.e. a first portion of the sensing lines. The first touch information serves as a touch output TO and is inputted to the touch sensing channels 116 of the first device 110. The touch sensing channels 116 are coupled to the sensing lines SL1 to sense the sensing lines SL1. Each of the touch sensing channels 116, for example, includes a connection switch MUX and a front-end circuit ADC to receive the first touch information from the touch display area AA1.

The second device 120 includes a timing controller 122, a plurality of display driving channels 124 and a plurality of touch sensing channels 126. For simplicity, only one display driving channel 124 and one touch sensing channel 126 are illustrated in FIG. 1, and the invention is not limited thereto. The timing controller 122 is coupled to the display driving channels 124. The timing controller 122 includes a data division circuit 123. The data division circuit 123 receives the image data from the display interface and performs a data division operation to obtain a second image data from the image data. The timing controller 122 outputs the second image data to the display driving channels 124. The display driving channels 124 are coupled to the data lines DL2 of the touch display area AA2, i.e. the second portion of the data lines DL. The display driving channels 124 drive the second image data to the data lines DL2. Each of the display driving channels 124, for example, includes an output buffer to drive the second image data to the corresponding data line DL2. The second image data serves as a source output SO and is outputted to the data lines DL2. In the present embodiment, the first image data and the second image data may be a first/second portion of an image frame, or may be from different image frames.

When a touch event happens in the touch display area AA2, a second touch information may be transmitted via the sensing lines SL2, i.e. a second portion of the sensing lines. The second touch information serves as a touch output TO and is inputted to the touch sensing channels 126 of the second device 120. The touch sensing channels 126 are coupled to the sensing lines SL2 to sense the sensing lines SL2. Each of the touch sensing channels 126, for example, includes a connection switch MUX and a front-end circuit ADC to receive the second touch information from the touch display area AA2.

The touch controller 130 is configured to receive respective touch information from the first device 110 and the second device 120. The touch controller 130 is disposed out of the touch display panel 900 in the present embodiment. The touch controller 130 includes a storage device 132, e.g. a flash memory, for storing the touch information. The respective touch information includes the first touch information corresponding to the sensing lines SL1 and the second touch information corresponding to the sensing lines SL2. The touch controller 130 is further configured to determine the touch event of the touch display panel 900 according to the first touch information and the second touch information.

In the present embodiment, the first touch information from the first device 110 and the second touch information from the second device 120 are both transmitted to the touch controller 130. The touch controller 130 analyzes and processes the first touch information and the second touch information, and thus the touch display areas AA1 and AA2 can be deemed as a whole for touch event determination. Therefore, even if the touch event happens at edge regions R1 and L2 of the touch display areas AA1 and AA2, the touch controller can correctly determine the touch event of the touch display panel 900 according to the first touch information and the second touch information.

The first device 110 and the second device 120 may be touch with display driver integrated-circuit chips (TDDI ICs), for example. The first device 110 and the second device 120 may be implemented in separate integrated-circuit chips. In the present embodiment, the first device 110 is implemented in a first integrated-circuit chip IC1, the touch controller 130 is implemented in a second integrated-circuit chip IC2, e.g. a touch integrated-circuit (TIC), and the second device 120 is implemented in a third integrated-circuit chip IC3. The integrated-circuit chips IC1, IC2 and IC3 are separate chips.

Figure 2:
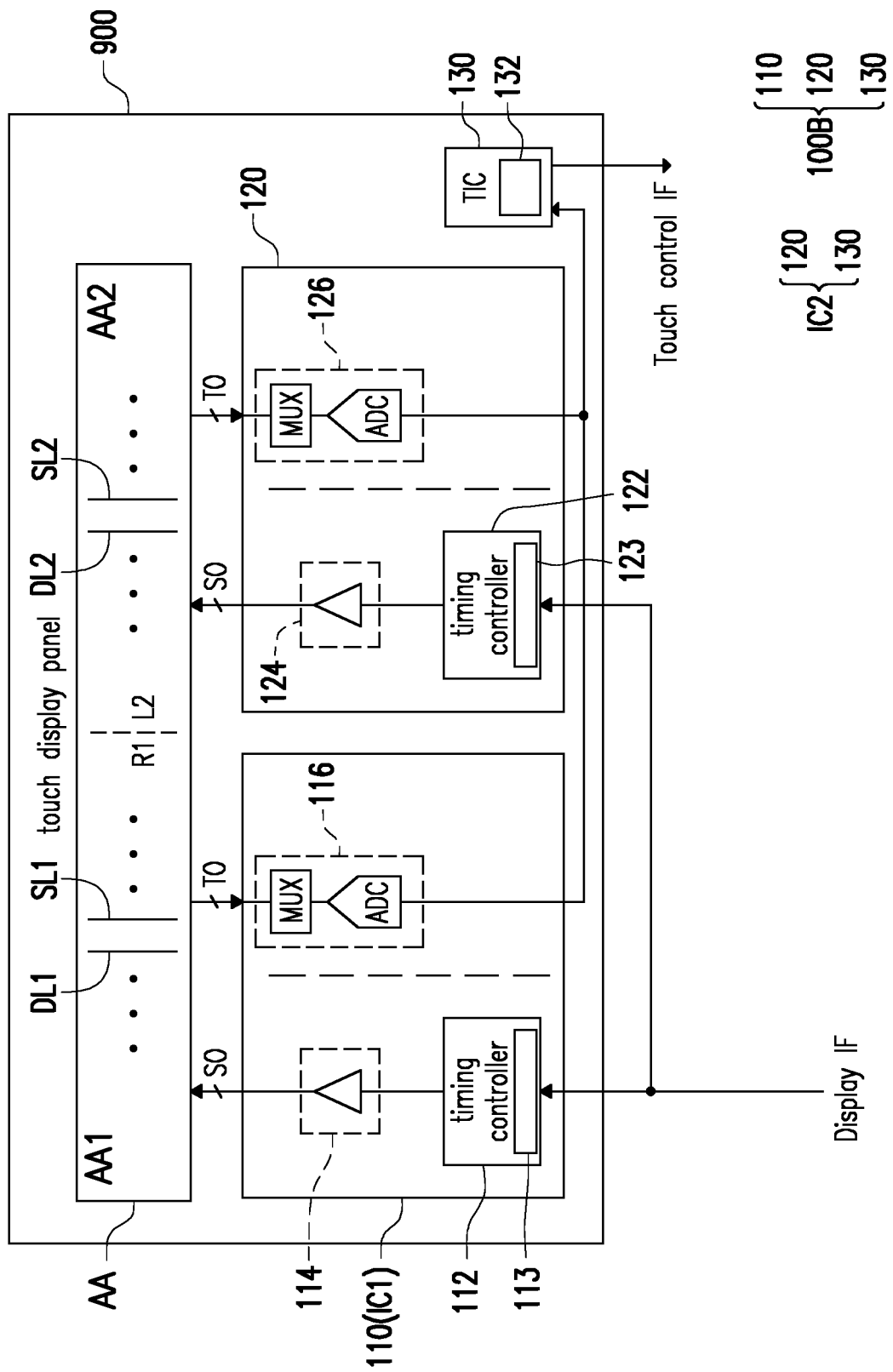
FIG. 2 illustrates a schematic diagram of an apparatus for driving a touch display panel according to another embodiment of the invention.

FIG. 2 illustrates a schematic diagram of an apparatus for driving a touch display panel according to another embodiment of the invention. Referring to FIG. 1 and FIG. 2, the apparatus 100B for driving the touch display panel 900 of the present embodiment is similar to the apparatus 100A depicted in FIG. 1, and the main difference therebetween lies in that the touch controller 130 of the apparatus 100B is disposed on the touch display panel 900 with a semiconductor package technology of chip-on-glass (COG), for example. In the present embodiment, the first device 110 is implemented in the first integrated-circuit chip IC1, and the second device 120 and the touch controller 130 are implemented in the second integrated-circuit chip IC2.

Figure 3:
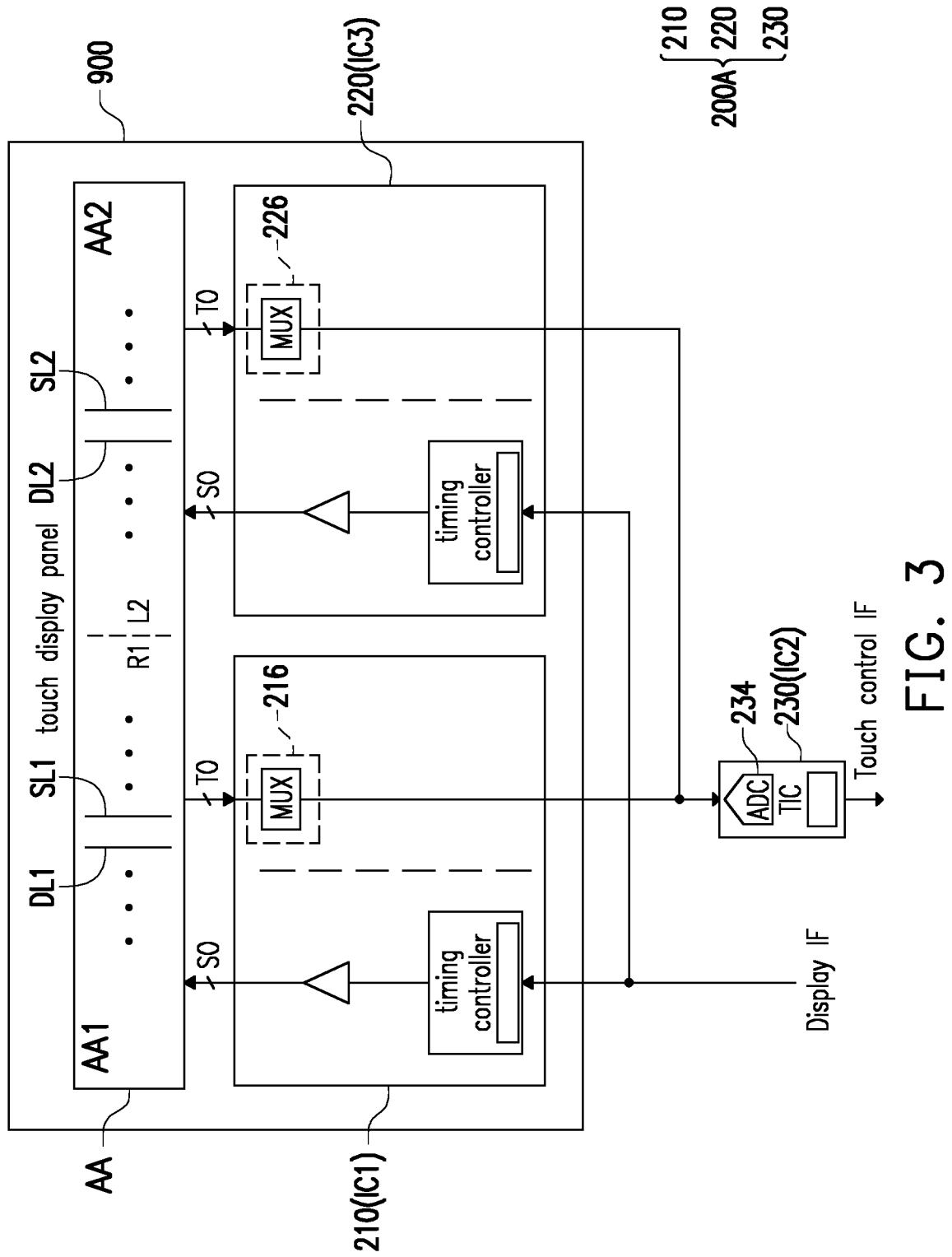
FIG. 3 illustrates a schematic diagram of an apparatus for driving a touch display panel according to another embodiment of the invention.

FIG. 3 illustrates a schematic diagram of an apparatus for driving a touch display panel according to another embodiment of the invention. Referring to FIG. 1 and FIG. 3, the apparatus 200A for driving the touch display panel 900 of the present embodiment is similar to the apparatus 100A depicted in FIG. 1, and the main difference therebetween lies in that the touch controller 230 further includes a front-end circuit 234 for receiving respective touch information from the first device 210 and the second device 220.

To be specific, the touch sensing channel 216 of the first device 210 includes the connection switch MUX for receiving the first touch information from the touch display area AA1. The touch sensing channel 226 of the second device 220 includes the connection switch MUX for receiving the second touch information from the touch display area AA2. The touch controller 230 receives the first touch information from the first device 210 and the second touch information from the second device 220 via the front-end circuit 234.

Figure 4:
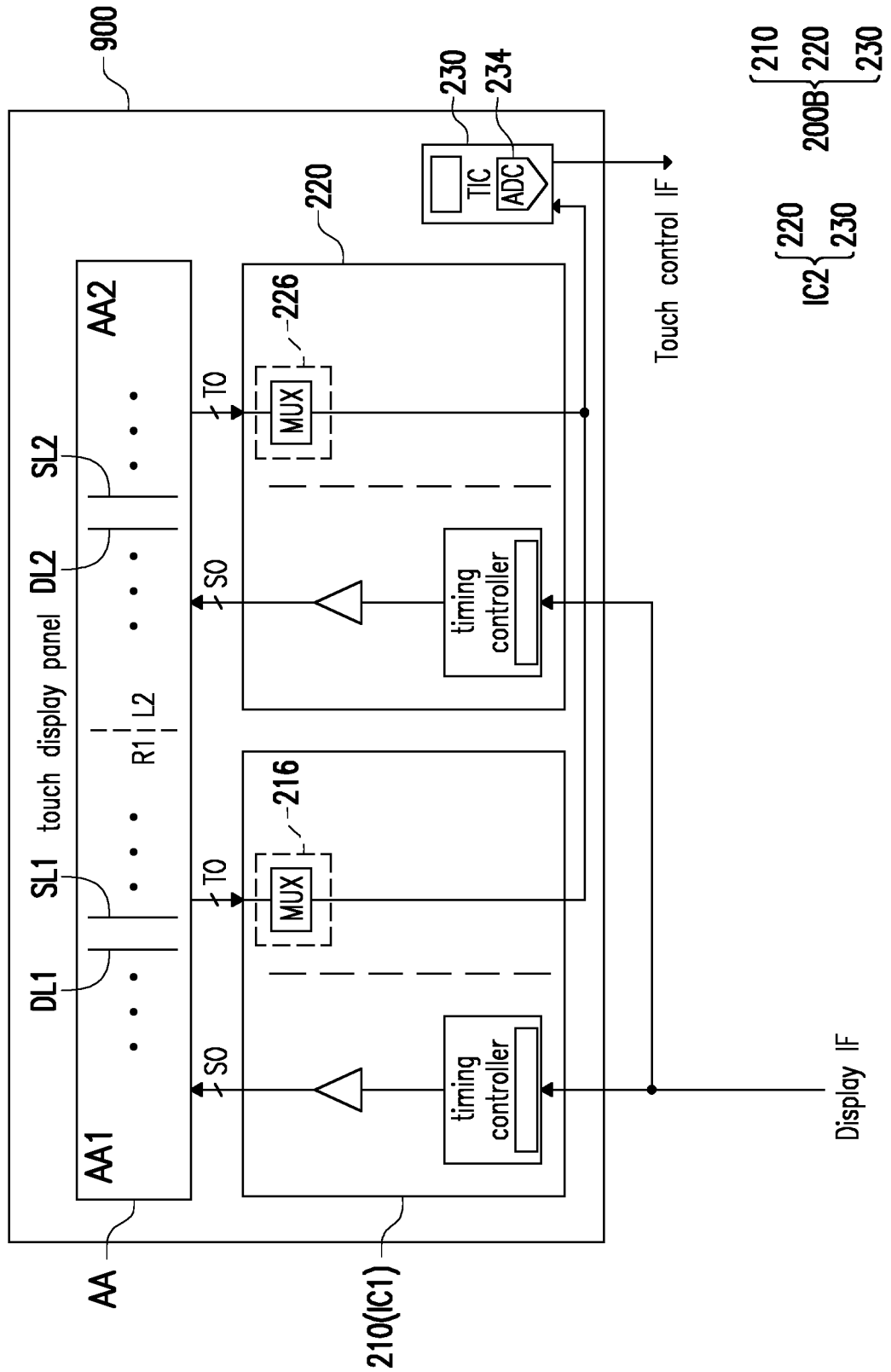
FIG. 4 illustrates a schematic diagram of an apparatus for driving a touch display panel according to another embodiment of the invention.

FIG. 4 illustrates a schematic diagram of an apparatus for driving a touch display panel according to another embodiment of the invention. Referring to FIG. 3 and FIG. 4, the apparatus 200B for driving the touch display panel 900 of the present embodiment is similar to the apparatus 200A depicted in FIG. 3, and the main difference therebetween lies in that the touch controller 230 of the apparatus 200B is disposed on the touch display panel 900 with the semiconductor package technology of COG, for example. In the present embodiment, the first device 110 is implemented in the first integrated-circuit chip IC1, and the second device 120 and the touch controller 130 are implemented in the second integrated-circuit chip IC2.

Figure 5:
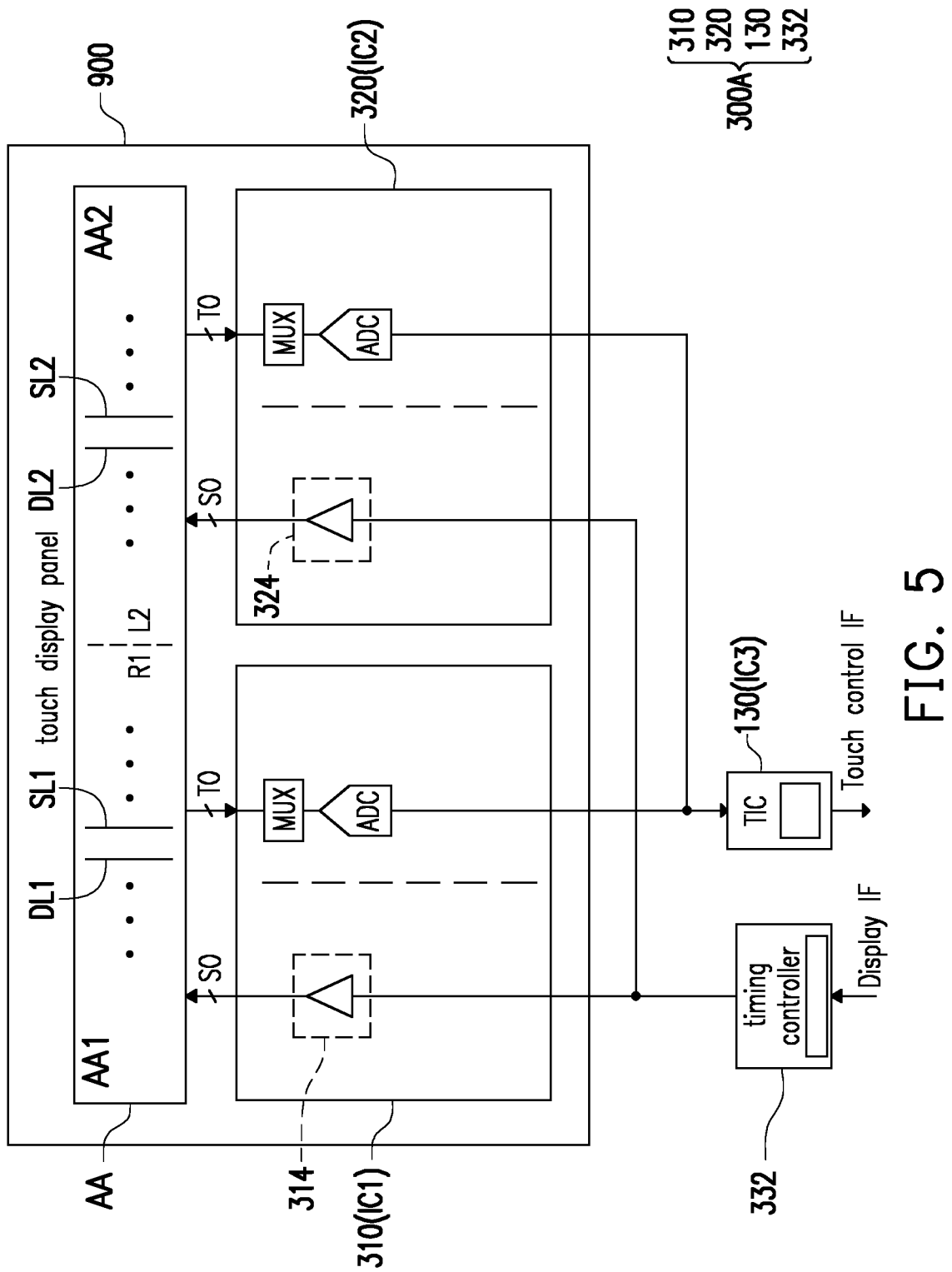
FIG. 5 illustrates a schematic diagram of an apparatus for driving a touch display panel according to another embodiment of the invention.

FIG. 5 illustrates a schematic diagram of an apparatus for driving a touch display panel according to another embodiment of the invention. Referring to FIG. 1 and FIG. 5, the apparatus 300A for driving the touch display panel 900 of the present embodiment is similar to the apparatus 100A depicted in FIG. 1, and the main difference therebetween lies in that the apparatus 300A further includes a timing controller 332. The timing controller 332 is coupled to the first device 310 and the second device 320. The timing controller 332 is configured to respectively output the first image data and the second image data to the first device 310 and the second device 320. The display driving channels 314 drive the first image data to the data lines DL1. The display driving channels 324 drive the second image data to the data lines DL2. The first image data and the second image data may be a first/second portion of an image frame, or may be from different image frames. Each of the display driving channels 314 and 324, for example, includes an output buffer. In the present embodiment, the touch controller 130 and the timing controller 332 may be implemented in the same integrated-circuit chip or separate integrated-circuit chips.

Figure 6:
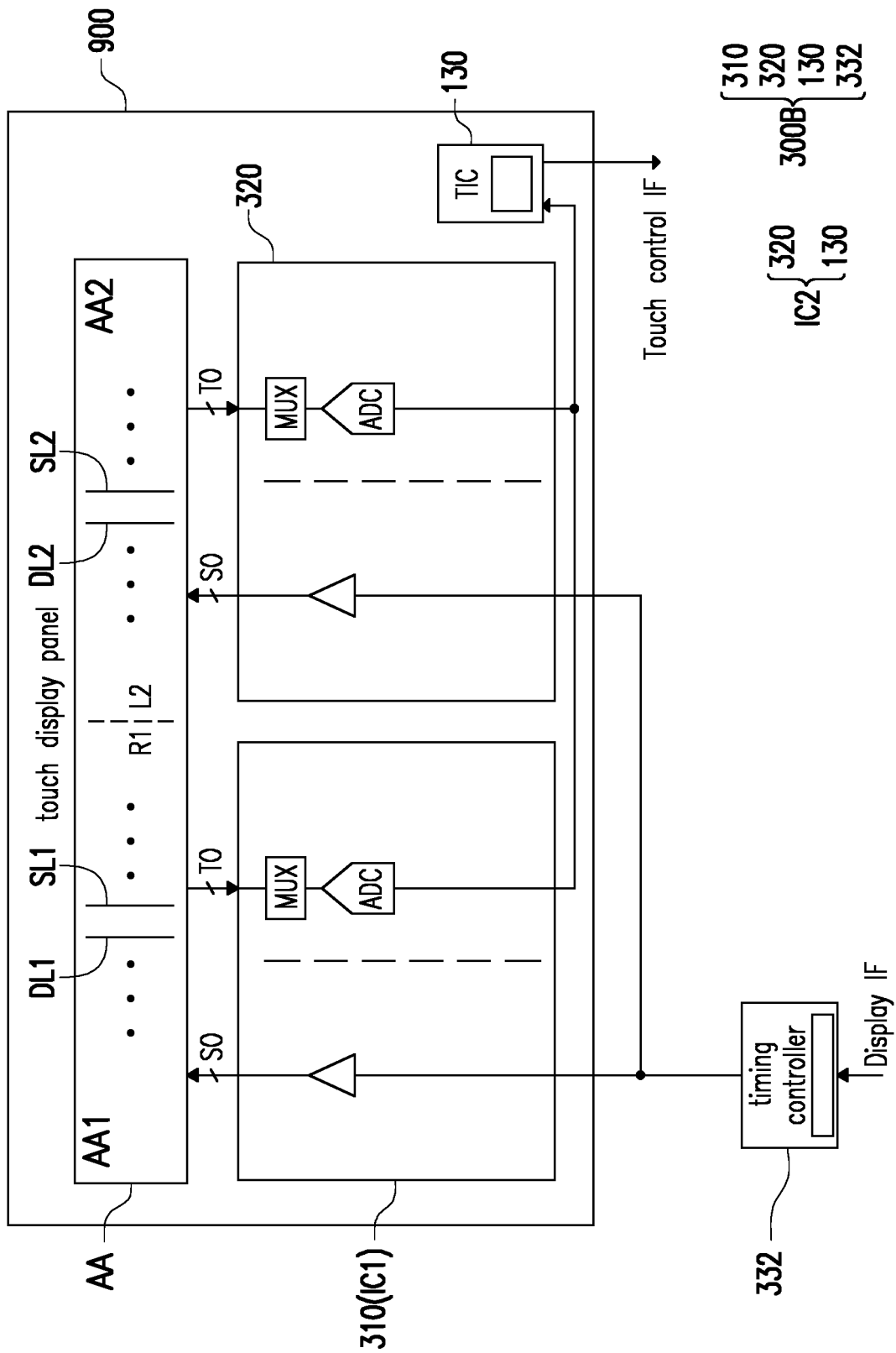
FIG. 6 illustrates a schematic diagram of an apparatus for driving a touch display panel according to another embodiment of the invention.

FIG. 6 illustrates a schematic diagram of an apparatus for driving a touch display panel according to another embodiment of the invention. Referring to FIG. 5 and FIG. 6, the apparatus 300B for driving the touch display panel 900 of the present embodiment is similar to the apparatus 300A depicted in FIG. 5, and the main difference therebetween lies in that the touch controller 130 of the apparatus 300B is disposed on the touch display panel 900 with the semiconductor package technology of COG, for example. In the present embodiment, the first device 310 is implemented in the first integrated-circuit chip IC1, and the second device 320 and the touch controller 130 are implemented in the second integrated-circuit chip IC2.

Figure 7:
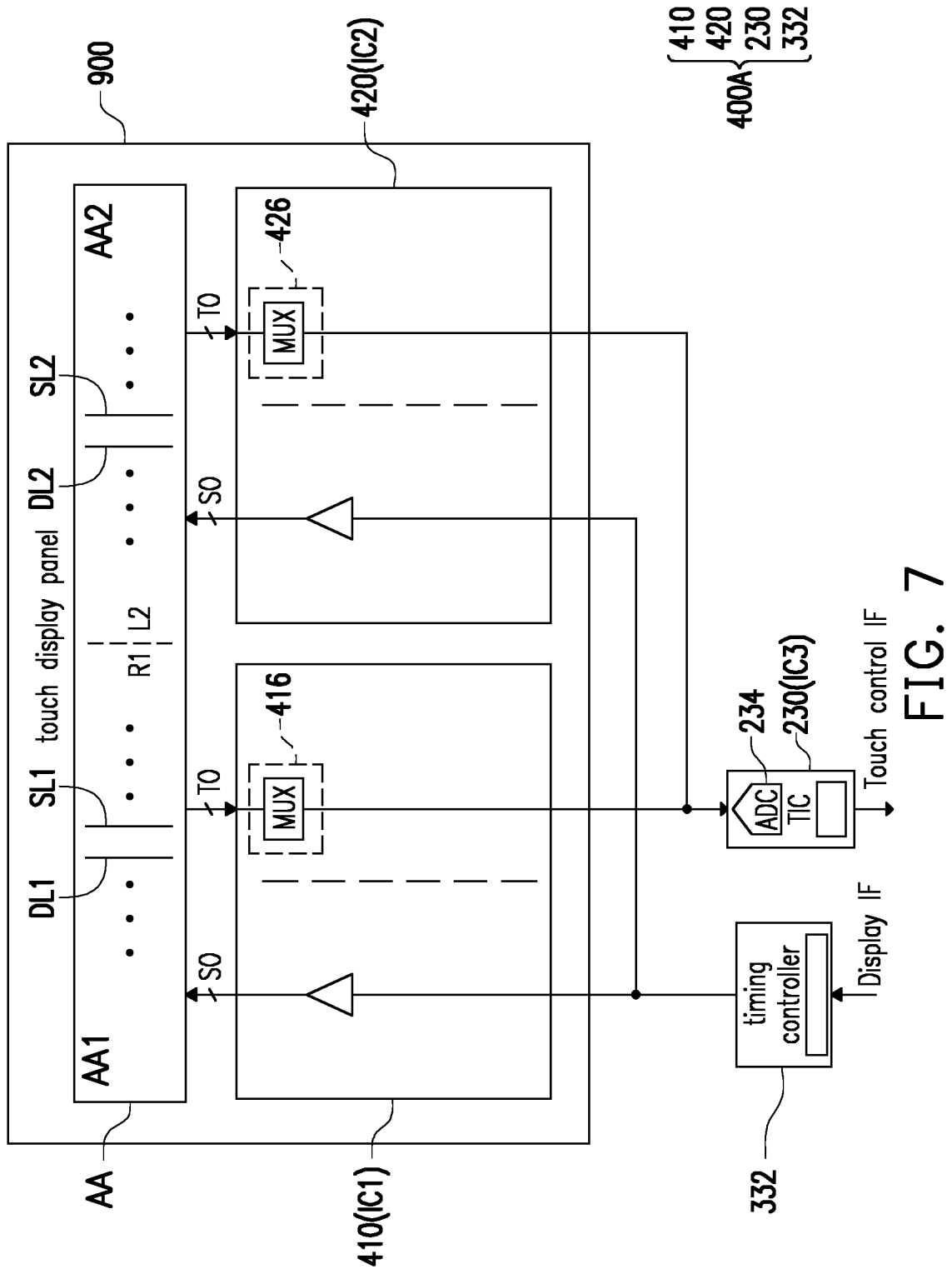
FIG. 7 illustrates a schematic diagram of an apparatus for driving a touch display panel according to another embodiment of the invention.

FIG. 7 illustrates a schematic diagram of an apparatus for driving a touch display panel according to another embodiment of the invention. Referring to FIG. 5 and FIG. 7, the apparatus 400A for driving the touch display panel 900 of the present embodiment is similar to the apparatus 300A depicted in FIG. 5, and the main difference therebetween lies in that the touch controller 230 further includes a front-end circuit 234 for receiving respective touch information from the first device 410 and the second device 420.

To be specific, the touch sensing channel 416 of the first device 410 includes the connection switch MUX for receiving the first touch information from the touch display area AA1. The touch sensing channel 426 of the second device 420 includes the connection switch MUX for receiving the second touch information from the touch display area AA2. The touch controller 230 receives the first touch information from the first device 410 and the second touch information from the second device 420 via the front-end circuit 234. In the present embodiment, the touch controller 230 and the timing controller 332 may be implemented in the same integrated-circuit chip or separate integrated-circuit chips.

Figure 8:
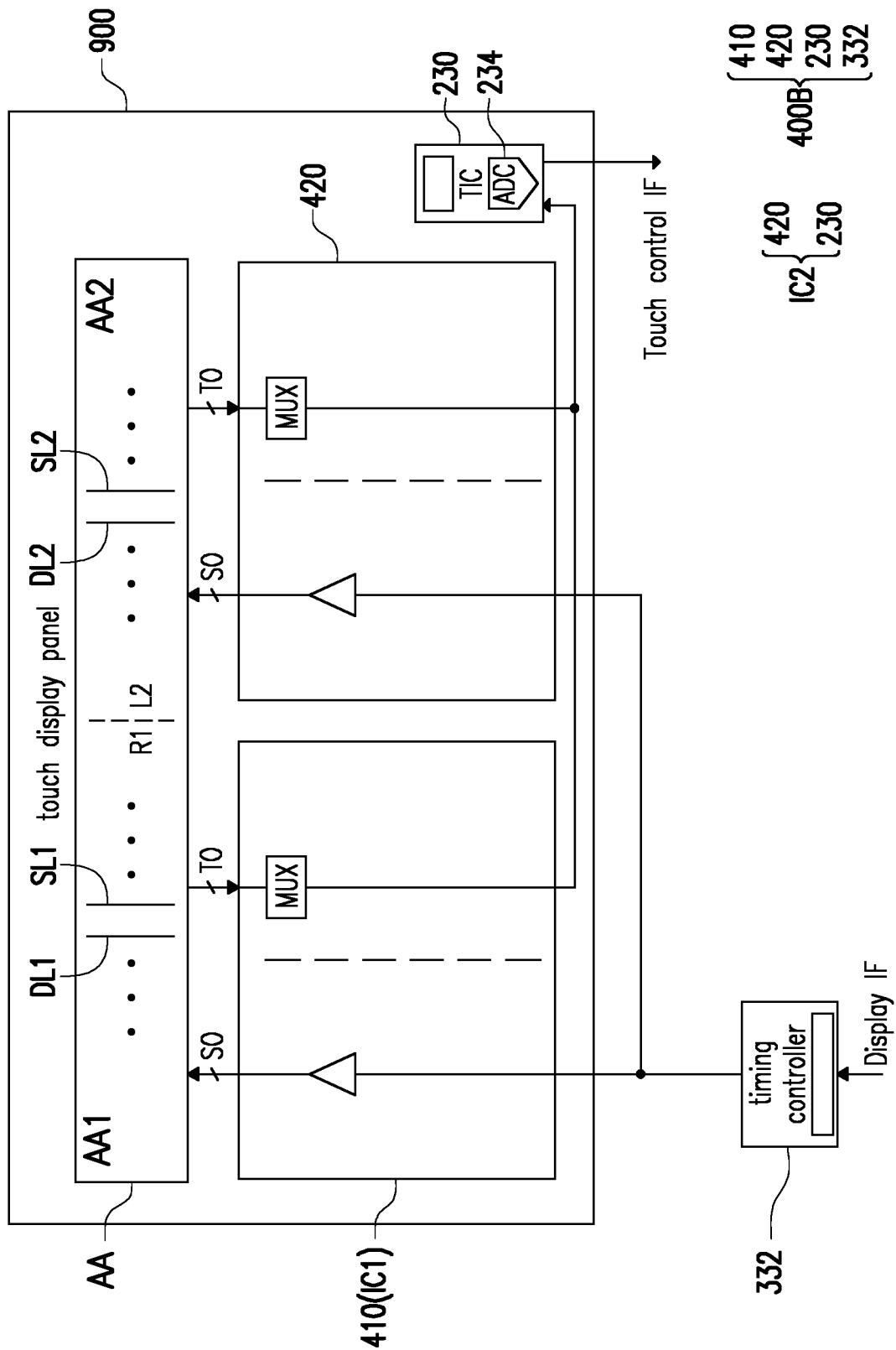
FIG. 8 illustrates a schematic diagram of an apparatus for driving a touch display panel according to another embodiment of the invention.

FIG. 8 illustrates a schematic diagram of an apparatus for driving a touch display panel according to another embodiment of the invention. Referring to FIG. 7 and FIG. 8, the apparatus 400B for driving the touch display panel 900 of the present embodiment is similar to the apparatus 400A depicted in FIG. 7, and the main difference therebetween lies in that the touch controller 230 of the apparatus 400B is disposed on the touch display panel 900 with the semiconductor package technology of COG, for example. In the present embodiment, the first device 410 is implemented in the first integrated-circuit chip IC1, and the second device 420 and the touch controller 230 are implemented in the second integrated-circuit chip IC2.

Figure 9:
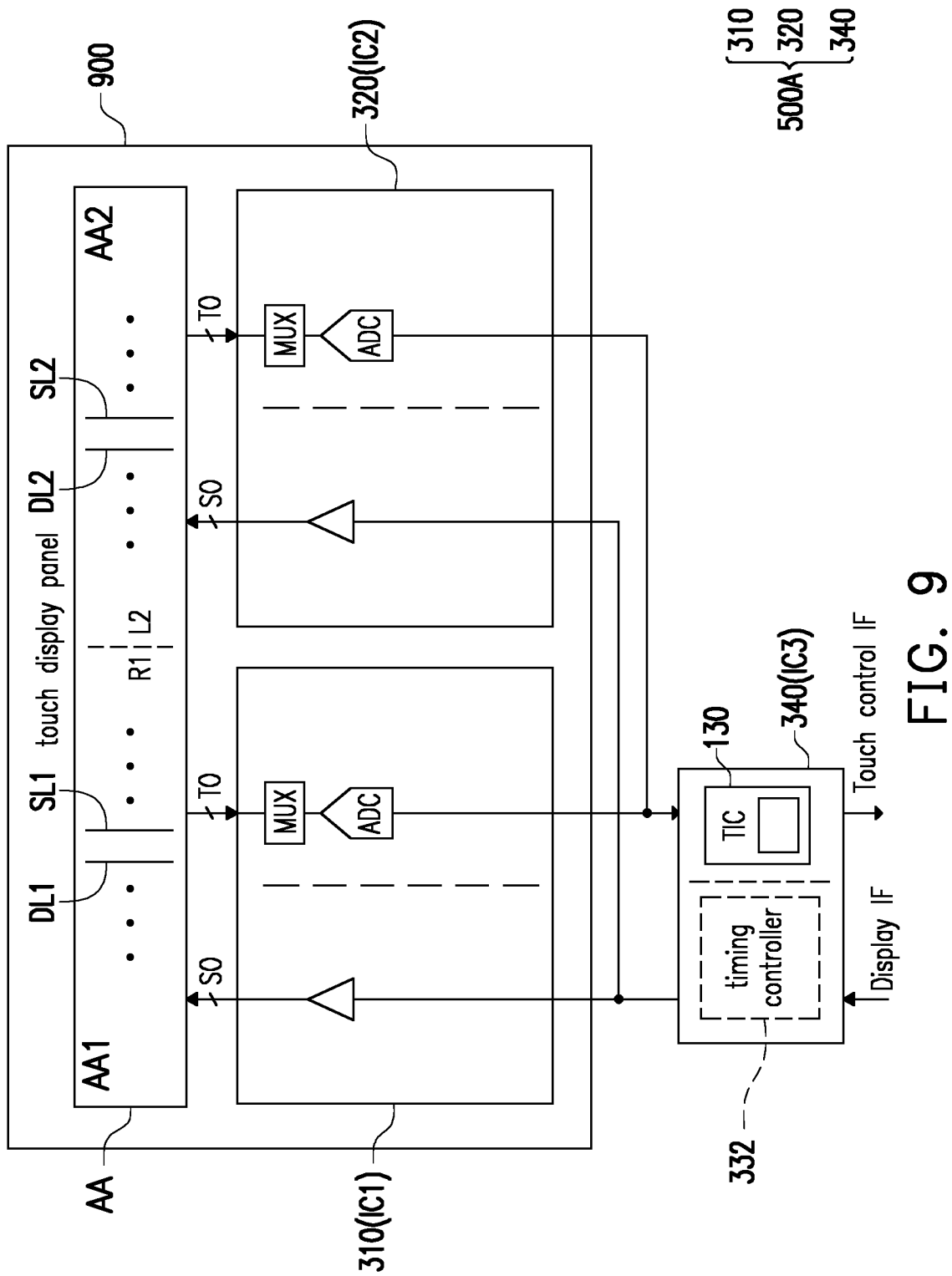
FIG. 9 illustrates a schematic diagram of an apparatus for driving a touch display panel according to another embodiment of the invention.

FIG. 9 illustrates a schematic diagram of an apparatus for driving a touch display panel according to another embodiment of the invention. Referring to FIG. 5 and FIG. 9, the apparatus 500A for driving the touch display panel 900 of the present embodiment is similar to the apparatus 300A depicted in FIG. 5, and the main difference therebetween lies in that the apparatus 500A further includes a third device 340. The third device 340 includes the touch controller 130 and the timing controller 332. In the present embodiment, the touch controller 130 and the timing controller 332 may be implemented in the third integrated-circuit chip IC3.

Figure 10:
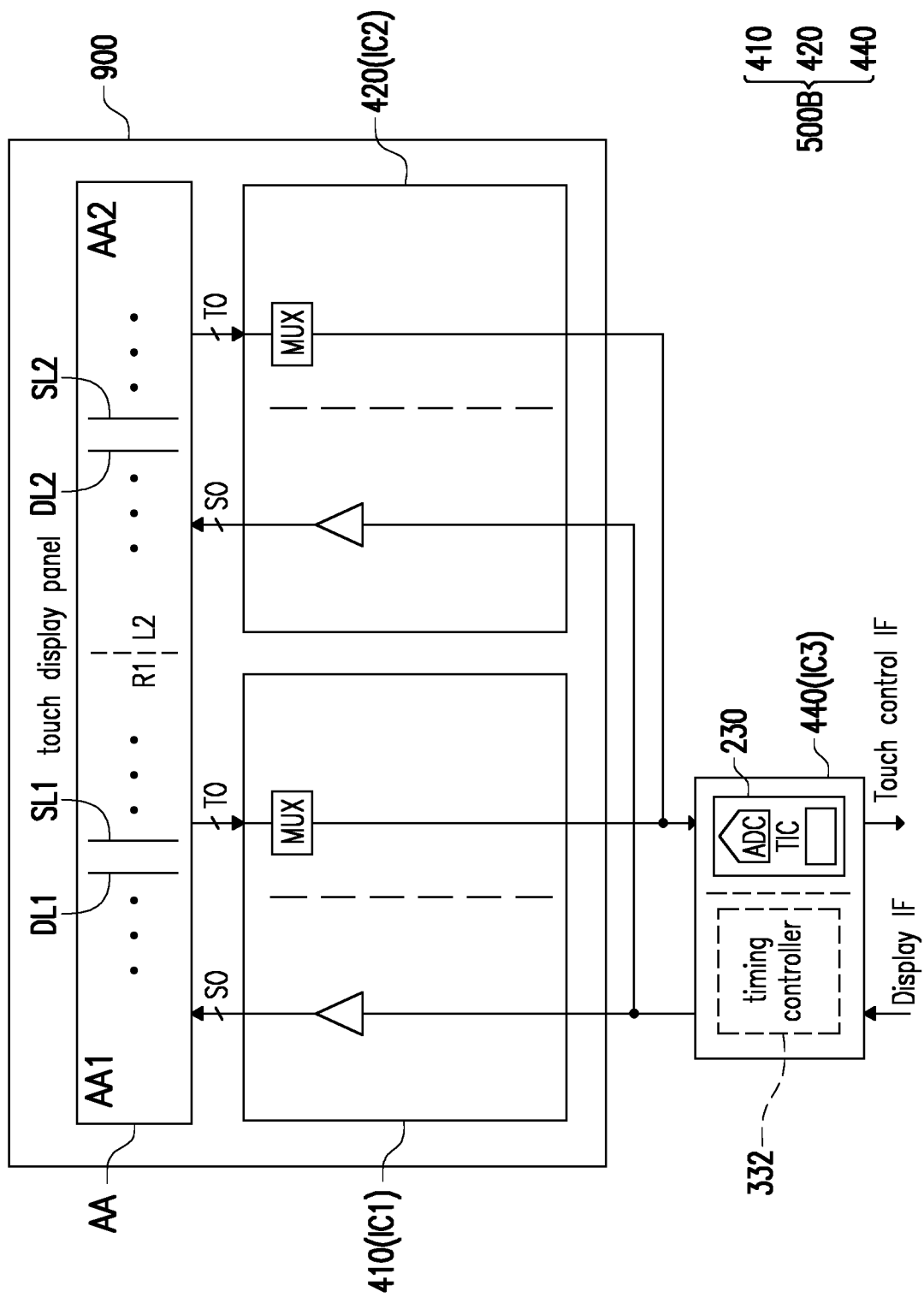
FIG. 10 illustrates a schematic diagram of an apparatus for driving a touch display panel according to another embodiment of the invention.

FIG. 10 illustrates a schematic diagram of an apparatus for driving a touch display panel according to another embodiment of the invention. Referring to FIG. 7 and FIG. 10, the apparatus 500B for driving the touch display panel 900 of the present embodiment is similar to the apparatus 400A depicted in FIG. 7, and the main difference therebetween lies in that the apparatus 500B further includes a third device 440. The third device 440 includes the touch controller 230 and the timing controller 332. In the present embodiment, the touch controller 230 and the timing controller 332 may be implemented in the third integrated-circuit chip IC3.

Figure 11:
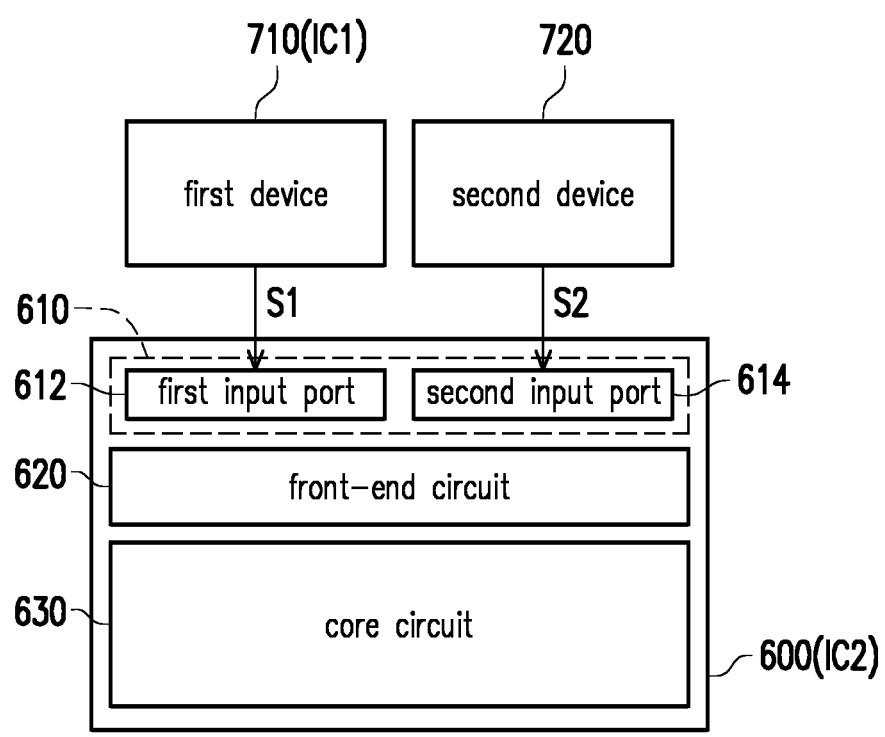
FIG. 11 illustrates a schematic diagram of a touch controller according to an embodiment of the invention.

FIG. 11 illustrates a schematic diagram of a touch controller according to an embodiment of the invention. Referring to FIG. 1 and FIG. 11, the touch controller 600 of the present embodiment includes an input and output circuit (I/O circuit) 610, a front-end circuit 620 and a core circuit 630. The touch controller 600 is configured to detect a touch event of the touch display panel 900 having a plurality of data lines DL1 and DL2 and a plurality of sensing lines SL1 and SL2. The I/O circuit 610 receives the respective touch information from a first device 710 and a second device 720. The I/O circuit 610 includes a first input port 612 and a second input port 614. The respective touch information includes a first touch information S1 and a second touch information S2. The first input port 612 is configured to receive the first touch information S1 from the first device 710. The second input port 614 is configured to receive the second touch information S2 from the second device 720. The first input port 612 and the second input port 614 can be formed by at least one of a data input terminal, a communication interface, or a media interface, or a plurality of combinations thereof.

The front-end circuit 620 is coupled to the first input port 612 and the second input port 614. The front-end circuit 620 is configured to receive the first touch information S1 from the first input port 612 and the second touch information S2 from the second input port 614. The front-end circuit 620 transmits the first touch information S1 and the second touch information S2 to the core circuit 630. The core circuit 630 is coupled to the front-end circuit 620. The core circuit 630 is configured to determine the touch event according to the first touch information S1 and the second touch information S2.

In an embodiment, the first device 710 and the second device 720 may be TDDI ICs as disclosed in FIG. 1 to FIG. 10. In another embodiment, the first device 710 and the second device 720 may be touch control integrated-circuit chips, for example.

In the present embodiment, the first device 710 is implemented in a first integrated-circuit chip IC1, and the touch controller 600 is implemented in a second integrated-circuit chip IC2. The first device 710 and the second device 720 may be implemented in separate integrated-circuit chips. The second device 720 and the touch controller 600 may be implemented in the same integrated-circuit chip or separate integrated-circuit chips.

Figure 12:
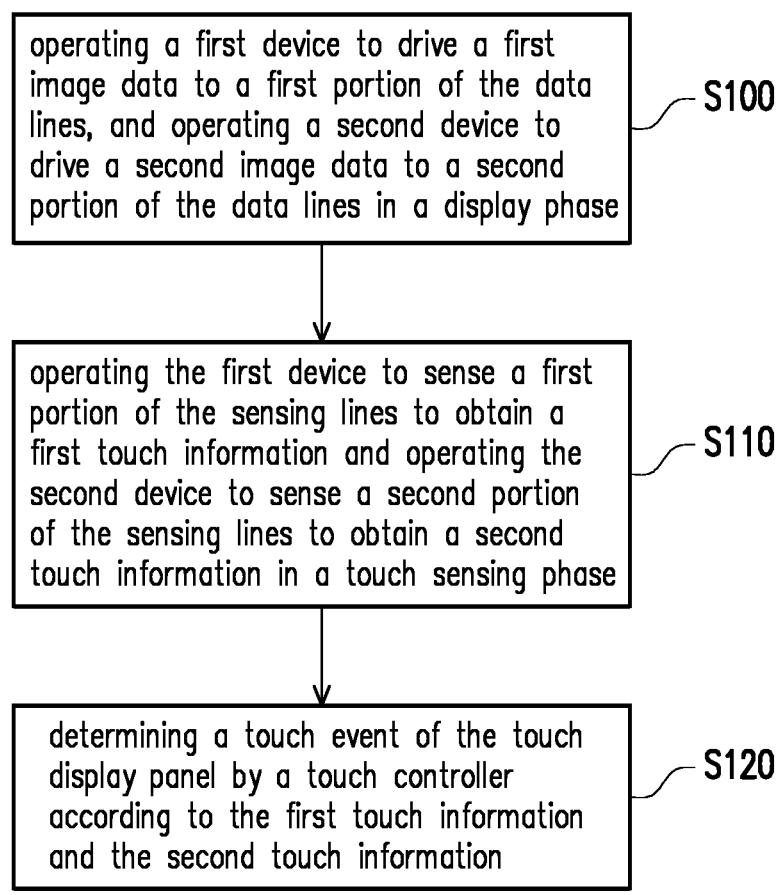
FIG. 12 illustrates a flowchart of a method for driving a touch display panel according to an embodiment of the invention.

FIG. 12 illustrates a flowchart of a method for driving a touch display panel according to an embodiment of the invention. Referring to FIG. 1 and FIG. 12, the method for driving the touch display panel is at least adapted to the apparatus 100A of FIG. 1, but the invention is not limited thereto. Taking the apparatus 100A of FIG. 1 for example, in step S100, operating a first device 110 to drive a first image data to a first portion of the data lines DL1, and operating a second device 120 to drive a second image data to a second portion of the data lines DL2 in a display phase. In step S110, operating the first device 110 to sense a first portion of the sensing lines SL1 to obtain a first touch information and operating the second device 120 to sense a second portion of the sensing lines SL2 to obtain a second touch information in a touch sensing phase. In step S120, determining a touch event of the touch display panel 900 by a touch controller 130 according to the first touch information and the second touch information. In addition, sufficient teaching, suggestion, and implementation illustration regarding the method for driving the touch display panel of the embodiments of the invention may be obtained from the foregoing embodiments of FIG. 1 to FIG. 11, and thus related description thereof is not repeated hereinafter.

In summary, in the embodiments of the invention, touch information from different devices are transmitted to the same touch controller. The touch controller analyzes and processes the touch information with the same parameters and/or program codes. Accordingly, the separate touch display areas can be deemed as a whole for touch event determination, and the touch information processing is simple. Therefore, even if the touch event happens at edge regions of the separate touch display areas, the touch controller can correctly determine the touch event of the touch display panel according to the received touch information.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An apparatus for driving a touch display panel having a plurality of data lines and a plurality of sensing lines, comprising:
    a first device comprising a plurality of display driving channels coupled to a first portion of the data lines to drive a first image data to the first portion of the data lines, and a plurality of touch sensing channels coupled to a first portion of the sensing lines to sense the first portion of the sensing lines;
    a second device comprising a plurality of display driving channels coupled to a second portion of the data lines to drive a second image data to the second portion of the data lines, and a plurality of touch sensing channels coupled to a second portion of the sensing lines to sense the second portion of the sensing lines; and
    a single touch controller, disposed outside the first device, configured to receive respective touch information from the first device and the second device, wherein the respective touch information comprises a first touch information corresponding to the first portion of the sensing lines and a second touch information corresponding to the second portion of the sensing lines, and the single touch controller is further configured to analyze the first touch information and the second touch information using same parameters to determine a touch event of the touch display panel,
    wherein the first device is implemented in a first integrated-circuit chip, the single touch controller is implemented in a second integrated-circuit chip, and the first device and the second device are configured to drive the same touch display panel,
    wherein the first device comprises a timing controller coupled to the display driving channels of the first device and configured to output the first image data to the display driving channels of the first device, and the second device comprises a timing controller coupled to the display driving channels of the second device and configured to output the second image data to the display driving channels of the second device.

2. The apparatus as claimed in claim 1, wherein the single touch controller comprises:
    a first input port, configured to receive a first touch information from the first device;
    a second input port, configured to receive a second touch information from the second device; and
    a core circuit, coupled to the first input port and the second input port, and configured to determine the touch event according to the first touch information and the second touch information.

3. The apparatus as claimed in claim 2, wherein the single touch controller further comprises:
    a front-end circuit, coupled to the first input port and the second input port and configured to receive the respective touch information from the first input port and the second input port and transmit the respective touch information to the core circuit.

4. The apparatus as claimed in claim 1, wherein the second device is implemented in the second integrated-circuit chip.

5. The apparatus as claimed in claim 1, wherein the second device is implemented in a third integrated-circuit chip.

6. The apparatus as claimed in claim 1, wherein the first image data and the second image data are a first portion and a second portion of an image frame or from different image frames.

7. A method for driving a touch display panel having a plurality of data lines and a plurality of sensing lines, comprising:
    operating a first device to drive a first image data to a first portion of the data lines, and operating a second device to drive a second image data to a second portion of the data lines in a display phase;
    operating the first device to sense a first portion of the sensing lines to obtain a first touch information and operating the second device to sense a second portion of the sensing lines to obtain a second touch information in a touch sensing phase; and analyzing the first touch information and the second touch information using same parameters to determine a touch event of the touch display panel by a single touch controller that is disposed outside the first device, wherein the first device is implemented in a first integrated-circuit chip, the single touch controller is implemented in a second integrated-circuit chip, and the first device and the second device are configured to drive the same touch display panel, wherein the first device comprises a timing controller coupled to the display driving channels of the first device and configured to output the first image data to the display driving channels of the first device, and the second device comprises a timing controller coupled to the display driving channels of the second device and configured to output the second image data to the display driving channels of the second device.

8. The method as claimed in claim 7, wherein the second device is implemented in the second integrated-circuit chip.

9. The method as claimed in claim 7, wherein the second device is implemented in a third integrated-circuit chip.

10. The method as claimed in claim 7, wherein the first image data and the second image data are a first portion and a second portion of an image frame or from different image frames.

11. A single touch controller for detecting a touch event of a touch display panel having a plurality of data lines and a plurality of sensing lines, comprising:
  a first input port, configured to receive a first touch information from a first device, wherein the controller is disposed outside the first device and the first device comprises a plurality of display driving channels, configured to be coupled to a first portion of the data lines to drive a first image data thereto, and a plurality of touch sensing channels, configured to be coupled to a first portion of the sensing lines and to sense the first portion of the sensing lines to obtain the first touch information;
  a second input port, configured to receive a second touch information from a second device, wherein the second device comprises a plurality of display driving channels, configured to be coupled to a second portion of the data lines to drive a second image data thereto, and a plurality of touch sensing channels, configured to be coupled to a second portion of the sensing lines and to sense the second portion of the sensing lines to obtain the second touch information; and
  a core circuit, coupled to the first input port and the second input port, and configured to analyze the first touch information and the second touch information using same parameters to determine the touch event,
  wherein the first device is implemented in a first integrated-circuit chip, the single touch controller is implemented in a second integrated-circuit chip, and the first device and the second device are configured to drive the same touch display panel,
  wherein the first device comprises a timing controller coupled to the display driving channels of the first device and configured to output the first image data to the display driving channels of the first device, and the second device comprises a timing controller coupled to the display driving channels of the second device and configured to output the second image data to the display driving channels of the second device.

12. The single touch controller as claimed in claim 11, further comprising:
  a front-end circuit, coupled to the first input port and the second input port and configured to receive the respective touch information from the first input port and the second input port and transmit the respective touch information to the core circuit.

13. The single touch controller as claimed in claim 11, wherein the second device is implemented in the second integrated-circuit chip.

14. The single touch controller as claimed in claim 11, wherein the second device is implemented in a third integrated-circuit chip.

15. A single touch controller for detecting a touch event of a touch display panel having a plurality of data lines and a plurality of sensing lines, comprising:
  a first input port, configured to receive a first touch information from a first device, wherein the first device comprises a plurality of touch sensing channels, configured to be coupled to a first portion of the sensing lines and configured to sense the first portion of the sensing lines to obtain the first touch information;
  a second input port, configured to receive a second touch information from a second device, wherein the controller is disposed outside the first device and the second device comprises a plurality of touch sensing channels, configured to be coupled to a second portion of the sensing lines and configured to sense the second portion of the sensing lines to obtain the second touch information; and
  a core circuit, coupled to the first input port and the second input port, and configured to analyze the first touch information and the second touch information using same parameters to determine the touch event,
  wherein the first device is implemented in a first integrated-circuit chip, the single touch controller is implemented in a second integrated-circuit chip, and the first device and the second device are configured to drive the same touch display panel,
  wherein the first device comprises a timing controller coupled to the display driving channels of the first device and configured to output the first image data to the display driving channels of the first device, and the second device comprises a timing controller coupled to the display driving channels of the second device and configured to output the second image data to the display driving channels of the second device.

16. The single touch controller as claimed in claim 15, further comprising:
  a front-end circuit, coupled to the first input port and the second input port and configured to receive the respective touch information from the first input port and the second input port and transmit the respective touch information to the core circuit.

17. The single touch controller as claimed in claim 15, wherein the second device is implemented in the second integrated-circuit chip.

18. The single touch controller as claimed in claim 15, wherein the second device is implemented in a third integrated-circuit chip.

* * * * *